(12) United States Patent
Podhola

(10) Patent No.: US 12,304,262 B2
(45) Date of Patent: May 20, 2025

(54) ELECTROMAGNETIC SHOCK ABSORBER

(71) Applicant: Kamil Podhola, Liberec (CZ)

(72) Inventor: Kamil Podhola, Liberec (CZ)

( * ) Notice: Subject to any disclaimer, the term of this patent is extended or adjusted under 35 U.S.C. 154(b) by 0 days.

(21) Appl. No.: 18/631,715

(22) Filed: Apr. 10, 2024

(65) Prior Publication Data

US 2024/0343083 A1 Oct. 17, 2024

(51) Int. Cl.
*B60G 13/00* (2006.01)
*B62K 25/04* (2006.01)

(52) U.S. Cl.
CPC .............. *B60G 13/00* (2013.01); *B62K 25/04* (2013.01); *B60G 2202/25* (2013.01); *B60G 2202/442* (2013.01); *B60G 2300/12* (2013.01)

(58) Field of Classification Search
None
See application file for complete search history.

(56) References Cited

U.S. PATENT DOCUMENTS

| | | | | |
|---|---|---|---|---|
| 3,559,027 A * | 1/1971 | Arsem | .................... | H02K 21/14 322/3 |
| 9,270,149 B1 * | 2/2016 | Casas | .................... | H02K 21/025 |
| 9,702,349 B2 * | 7/2017 | Anderson | ............. | B60G 17/052 |
| 11,634,167 B1 * | 4/2023 | Dowle | .................... | B60G 11/14 180/6.62 |
| 2010/0207309 A1 * | 8/2010 | Park | ........................ | B60G 13/14 267/195 |
| 2013/0002052 A1 * | 1/2013 | Hunter | .................... | H02K 33/16 310/12.25 |
| 2015/0188400 A1 * | 7/2015 | Kemp | .................... | H02K 53/00 74/DIG. 9 |
| 2016/0032998 A1 * | 2/2016 | Dhaens | .................... | B60G 13/16 188/267 |

FOREIGN PATENT DOCUMENTS

| | | | | |
|---|---|---|---|---|
| CN | 103828201 A | * | 5/2014 | ............. H02K 16/00 |
| CN | 118488900 A | * | 8/2024 | |
| EP | 4446610 A1 | * | 10/2024 | ............. B60G 13/00 |
| WO | WO-02091552 A2 | * | 11/2002 | ......... B60G 17/0157 |

* cited by examiner

*Primary Examiner* — Nicole T Verley

(57) ABSTRACT

The invention relates to an electromagnetic shock absorber (ESA) with a shock absorbing unit having a rotor coupled with a conductive disc or drum, the system providing one or more transversely oriented magnetic fields by the shock absorbing unit generating eddy currents in the conductive disc or drum and exerting a Lorentz force opposite to the velocity of the conductive disc or drum; the rotor characterised by being in a conductive contact with an electric control circuit. The shock absorbing unit can be a double-acting unit, it can contain a magnetic element. It can provide translationally rotational movement. The ESA can be couplable or coupled with different moving means, with different vehicles. It can be fabricated from different materials. The ESA can be couplable or coupled with different mechanocomponents and/or electrocomponents. A method is proposed for operating the ESA to provide a shock absorbing effect and/or a propulsion effect.

12 Claims, 3 Drawing Sheets

ELECTROMAGNETIC SHOCK ABSORBER

This application claims the benefit and priority of a patent application No. EP 23020179.0, filed before EPO on 11 Apr. 2023 and is hereby incorporated by reference in its entirety.

TECHNICAL FIELD

The invention relates to an electromagnetic rotary shock absorber.

BACKGROUND ART

Electromagnetic rotary shock absorbers can be connected to a vehicle body or used in other electrotechnical applications. Such shock absorbers can be also used as energy harvesters. Such shock absorbers can be used to adjust operational characteristics of a vehicle suspension system or other systems. Each group of vehicles or each application can have different demands on particular systems and their functions. Sensors and driving units can be coupled with active, semi-adaptive suspensions or the other systems. The shock absorbing systems can adjust the spring or vibration-damper characteristics; they can regulate the distance between a supporting surface and a sprung part of the vehicle; they can lock suspension during use, e.g. due to speed or load [i.e. the systems can control jounce and rebound; ground clearance; roll, pitch and yaw, etc.]. The controllers can control energy harvesting and other system parameters.

DISCLOSURE OF INVENTION

The object of the present invention is to propose an electromagnetic rotary shock absorber comprising: a shock absorbing unit with a rotor conductively coupled with a conductive disc or drum and wherein one or more to the direction of rotation transversally oriented magnetic fields are provided by the shock absorbing unit to generate currents in the conductive disc or drum and to exert a Lorentz force opposite to the velocity of the conductive disc or drum, the electromagnetic rotary shock absorber characterized in that said rotor is in at least partial conductive contact with an electric control circuit.

It is yet another object to provide the electromagnetic rotary shock absorber with a double-acting shock absorbing unit.

It is yet another object to provide the electromagnetic rotary shock absorber containing a defined magnetic element.

It is yet another object to provide the electromagnetic rotary shock absorber further providing translationally rotational movement.

It is yet another object to provide the electromagnetic rotary shock absorber couplable or coupled with a defined moving mean (including various suspension systems).

It is yet another object to provide the electromagnetic rotary shock absorber couplable or coupled with defined vehicle types.

It is yet another object to provide the electromagnetic rotary shock absorber fabricated of a defined material.

It is yet another object to provide the electromagnetic rotary shock absorber couplable or coupled with a defined electro- and/or mechanocomponent.

Another object of the present invention is to propose a method for operating an electromagnetic shock absorbing unit using an electromagnetic rotary shock absorber comprising a shock absorbing unit with a rotor conductively coupled with a conductive disc or drum and wherein one or more to a direction of rotation transversally oriented magnetic fields are provided by the shock absorbing unit to generate currents in the conductive disc or drum and to exert a Lorentz force opposite to the velocity of the conductive disc or drum, the electromagnetic rotary shock absorber characterized in that the rotor is in at least partial conductive contact with an electric control circuit, the method comprising the steps of:
  providing the one or more transversally oriented magnetic fields to provide a braking effect;
  generating currents in the conductive disc or drum to provide a propulsive effect,
wherein the steps can be interchanged and/or combined and/or repeated.

It is yet another object to provide the method with the shock absorbing unit coupled to a controller.

It is yet another object to provide the method with the shock absorbing unit controlled by a defined control.

In a first aspect, the invention discloses an electromagnetic rotary shock absorber.

In a second aspect, the invention discloses a method for operating the electromagnetic rotary shock absorber.

BRIEF DESCRIPTION OF DRAWINGS

The invention will now be described by way of example. Only essential elements of the invention are schematically shown and not to scale nor in proportions to facilitate immediate understanding, emphasis being placed upon illustrating the principles of the invention.

BEST MODE FOR CARRYING OUT THE INVENTION

Figure 1:
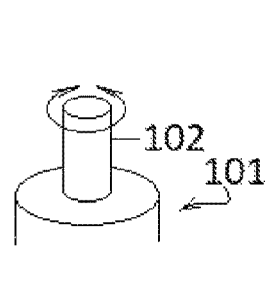
FIG. 1 is a perspective illustration of an electromagnetic rotary shock absorber.

The following detailed description shows the best contemplated modes of exemplary embodiments. The description is made for the purpose of illustrating the general principles of the invention, and in such a detail that a skilled person in the art can recognise the advantages of the invention, and can be able to make and use the invention. The objects and advantages of this invention may be realized and obtained as pointed out in the appended claims. Additional advantages may be learned by practice of the invention. The detailed description is not intended to limit the principle of the presented invention, but only to show the possibilities of it and to explain the meaning and the sense of the terms used in the appended claims. The description and the detailed description are exemplary and explanatory only.

The terms used in the claims and the specifications shall refer to their synonyms as well.

As used in the claims and the specification, the singular forms are intended to include the plural forms as well and vice versa.

As used in the claims and the specification, the terms "disc", "drum" shall also refer to spoked wheel, wire wheel, corrugated drum, squirrel cages, and the like, wherein combinations of discs and drums can be provided as well within one or more apparatuses or systems.

As used in the claims and the specification, the term "gear device" shall refer to gears, gear boxes, planetary gears, reduction gear sets, differential gears, variators, etc. Various reduction ratios can be used. Various types of gear profiles [e.g. with involute, cycloidal, helical, herringbone, bevel, etc., gear teeth] can be used.

As used in the claims and the specification, the term "transmission device" shall refer to belts, chains, cardans, cogwheels, sprockets, shafts, continuously variable transmissions, etc.

As used in the claims and the specification, the term "electricity generator" shall refer to AC generators, DC generators, motor generators, homopolar generators (disc types, drum types, combined types), etc. The term shall refer to constructions such as permanent magnets and/or electromagnets (concentrically) disposed around the rotor base or other rotating components to generate electricity, the term shall refer to axial or radial flux generators, etc.

As used in the claims and the specification, the term "processor" shall refer to programmable systems including microcontrollers, application specific integrated circuits (ASIC), reduced instruction set circuits (RISC), programmable logic circuits (PLC), system executing supervisory, Supervisoriy Control and Data Acquisition (SCADA) programs, etc.

The term "to couple" and derivatives shall refer to a direct or indirect connection via another device and/or connection, such a connection can be mechanical, hydraulic, electrical, electronic, electromagnetic, pneumatic, communication, functional, etc. The connection can be temporary, permanent, detachably attachable, scalable, slotable. Any additional systems may be coupled to the elements, components, etc. and to the system of the invention.

The terms "to comprise", "to include", "to contain", "to provide" and derivatives specify the presence of an element, but do not preclude the presence or addition of one or more other elements or groups and combinations thereof.

The term "consisting of" characterises a Markush group which is by nature closed. Single members of the group are alternatively useable for the purpose of the invention. Therefore, a singular if used in the Markush group would indicate only one member of the group to be used. For that reason are the countable members listed in the plural. That means together with qualifying language after the group "or combinations thereof" that only one member of the Markush group can be chosen or any combination of the listed members in any numbers. In other words, although elements in the Markush groups may be described in the plural, the singular is contemplated as well. Furthermore, the phrase "at least one" preceding the Markush groups is to be interpreted that the group does not exclude one or more additional elements preceded by the phrase.

The invention will be described in reference to the accompanying drawings.

FIG. 1 is a perspective illustration of an electromagnetic rotary shock absorber, comprising: a shock absorbing unit (101) with a rotor (102) coupled with a conductive disc or drum (not shown) [which can be provided inside the unit (101)] and wherein one or more transversally oriented magnetic fields are provided by the shock absorbing unit (101) to generate currents in the conductive disc or drum and to exert a Lorentz force opposite to the velocity of the conductive disc or drum. The electromagnetic shock absorber characterized in that the rotor (102) is in at least partial conductive contact with an electric control circuit (not shown).

The electromagnetic shock absorbing unit can be a double-acting unit.

Figure 2:
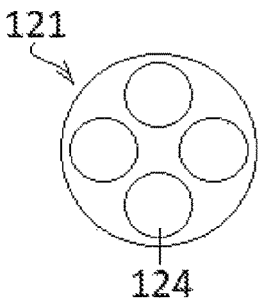
FIG. 2 is a frontal view of a shock absorbing unit with one or more electromagnets.

FIG. 2 is a frontal view of a shock absorbing unit (121) which can contain one or more electromagnets (124).

Figure 3:
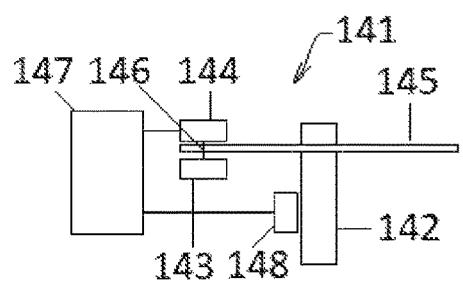
FIG. 3 is a schematic diagram of an electromagnetic rotary shock absorber comprising a shock absorbing unit with a rotor coupled with a conductive disc.

FIG. 3 is a schematic diagram of an electromagnetic rotary shock absorber comprising a shock absorbing unit (141) with a rotor (142) coupled with a conductive disc (145) wherein one or more transversally oriented magnetic fields (146) are provided by the shock absorbing unit (141) which can contain a first magnetic element (143) [which can contain an electromagnet, electric conductors, etc.] and a second magnetic element (144) [which can be composed analogically] to generate currents in the conductive disc (145). The electromagnetic shock absorber characterized in that the rotor (142) is in at least partial conductive contact (148) [e.g. by means of a conductive bearing, a slip ring, a brush, etc.] with an electric control circuit (147) [e.g. including a control unit which is here presented as a "black box" providing desired functions]. Another conductive contact can be provided at any part of the rotor (142) [e.g. at a periphery of the conductive disc (145) for example by means of the first and/or second magnetic element (143, 144) unit which either can be constructed as a hybrid contact/contactless unit, etc.]

Figure 4:
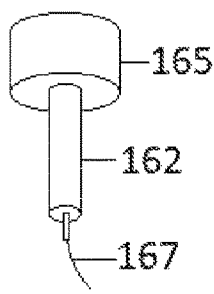
FIG. 4 is a schematic perspective view of an unilateraly coupled conductive drum for an electromagnetic rotary shock absorber.

FIG. 4 is a schematic perspective view of a conductive drum (165). A rotor (162) is in at least partial conductive contact with an electric control circuit (167) [e.g. by means of a wired conductor which can be a wire, a printed circuit board conductive trace, a conductive painting, a power cable, a signal cable, etc.].

Figure 5:
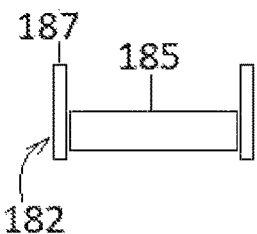
FIG. 5 is a schematic side view of a bilaterally coupled conductive drum for an electromagnetic rotary shock absorber.

FIG. 5 is a schematic side view of a conductive drum (185). A rotor (182) is in at least partial conductive contact with an electric control circuit (187) at both ends [e.g. by means of conductive bearings].

Figure 6:
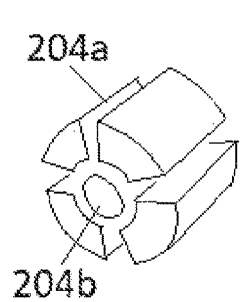
FIG. 6 is a schematic perspective view of electromagnets of a shock absorbing unit to generate currents in a conductive drum.

FIG. 6 is a schematic perspective view of electromagnets which can have circumferential poles (204a) and a central pole (204b) of a shock absorbing unit (not shown) to provide a transversely oriented magnetic field to generate currents in a conductive drum (not shown).

Figure 7:
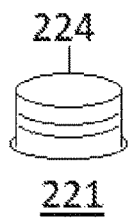
FIG. 7 is a schematic oblique view of an electromagnet for a shock absorbing unit with a conductive disc.

FIG. 7 is a schematic oblique view of a shock absorbing unit (221) which can contain one or more electromagnets (224) [which can have a ferrite core, an air core, a core from a soft magnetic material, etc.] to provide a transversally oriented magnetic field (not shown) to generate currents in a conductive disc or drum (not shown).

Figure 8:
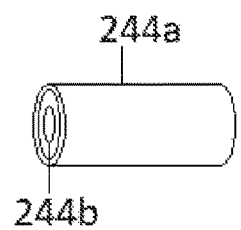
FIG. 8 is a schematic oblique view of an electromagnet for a shock absorbing unit with a conductive drum.

FIG. 8 is a schematic oblique view of an electromagnet which can have a circumferential pole (244a) and a central pole (244b) of a shock absorbing unit (not shown) to generate currents in a conductive drum (not shown).

Figure 9:
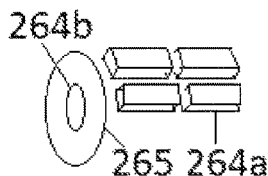
FIG. 9 is a schematic oblique view of another electromagnet with a plurality of poles for a shock absorbing unit with a conductive drum.

FIG. 9 is a schematic oblique view of an electromagnet which can have circumferential poles (264a) and a central pole (264b) of a shock absorbing unit (not shown) to generate currents in a conductive drum (265).

Figure 10:
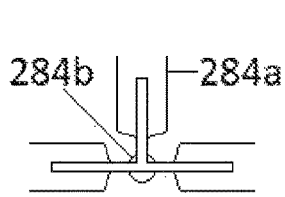
FIG. 10 is a schematic frontal view of another electromagnet with circumferentially spaced poles for a shock absorbing unit with a conductive drum.

FIG. 10 is a schematic frontal view of an electromagnet which can have circumferential poles (284a) and a central pole (284b) of a shock absorbing unit (not shown) to generate currents in a conductive drum (not shown).

Figure 11:
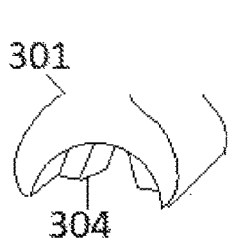
FIG. 11 is a partial schematic perspective view of a shock absorbing unit having a conductive drum.

FIG. 11 is a schematic perspective view of a shock absorbing unit (301) to provide one or more transversally oriented magnetic fields by electromagnets (304) [which can have any shape and which can for example flush with an inner surface of the unit (301)] to generate currents in a conductive drum (not shown).

Figure 12:
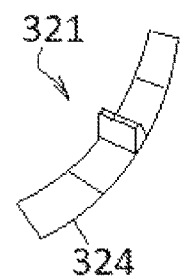
FIG. 12 is a schematic perspective view of electromagnets providing one or more axially oriented magnetic fields generating currents in a conductive disc.

FIG. 12 is a schematic perspective view of a shock absorbing unit (321) (partially shown) to provide one or more transversally oriented magnetic fields [e.g. axially oriented] by electromagnets (324) to generate currents in a conductive disc (not shown).

Figure 13:
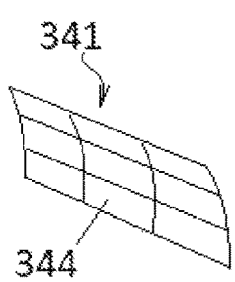
FIG. 13 is a schematic perspective view of electromagnets providing one or more radially oriented magnetic fields generating currents in a conductive drum.

FIG. 13 is a schematic perspective view of a shock absorbing unit (341) (partially shown) to provide one or more transversally oriented magnetic fields [e.g. radially oriented] by electromagnets (344) to generate currents in a conductive drum (not shown).

Figure 14:
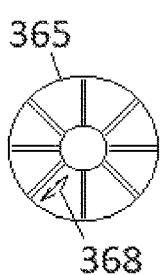
FIG. 14 is a schematic perspective view of a spoked wheel type conductive disc.

FIG. 14 is a schematic perspective view of a conductive disc (365) [which can be a spoked wheel] wherein a shock absorbing unit (not shown) can provide one or more transversally oriented magnetic fields (not shown) to generate currents (368) [e.g. substantially radially oriented].

Figure 15:
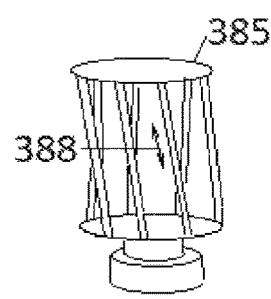
FIG. 15 is a schematic perspective view of a squirell cage type conductive drum.

FIG. 15 is a schematic perspective view of a conductive drum (385) [which can be a squirrel cage] wherein a shock absorbing unit (not shown) can provide one or more transversally oriented magnetic fields (not shown) to generate currents (388) [e.g. substantially axially oriented].

Figure 16:
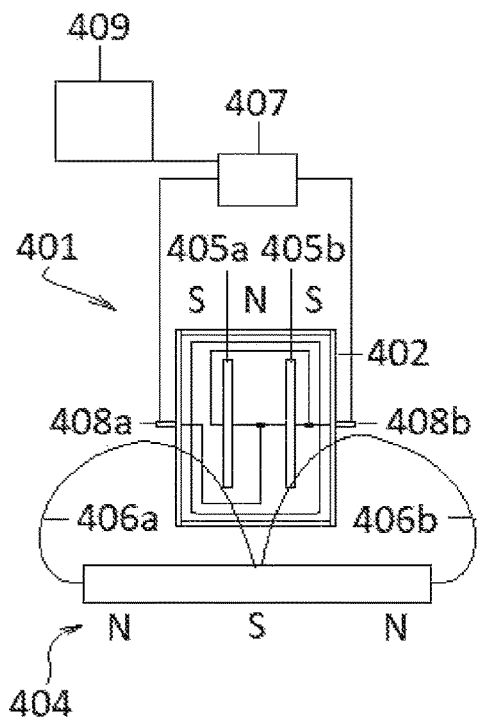
FIG. 16 is a schematic diagram of an electromagnetic rotary shock absorber coupled with bilateral conductive bearings.

FIG. 16 is a schematic diagram of an electromagnetic rotary shock absorber comprising a shock absorbing unit (401) with a rotor (402) coupled with conductive discs (405a, 405b) wherein one or more transversally oriented magnetic fields (406a, 406b) are provided by the shock absorbing unit (401) which can contain a permanent magnet (not shown) and/or an electromagnet (404) to generate currents in the conductive discs (405a, 405b). The electromagnetic shock absorber characterized in that the rotor (402) is in at least partial conductive contact (408a, 408b) [e.g. by means of conductive bearings, etc.] with an electric control circuit (407) [e.g. a drive circuit for power and data transmission and including a control unit providing control functions and which can also control the electromagnet (404)] which can be coupled with a rechargeable power source (409) [which can be a vehicle battery/capacitor combined source with a source management system and which can be coupled via a converter with a high voltage battery/capacitor combined source, etc.].

Figure 17:
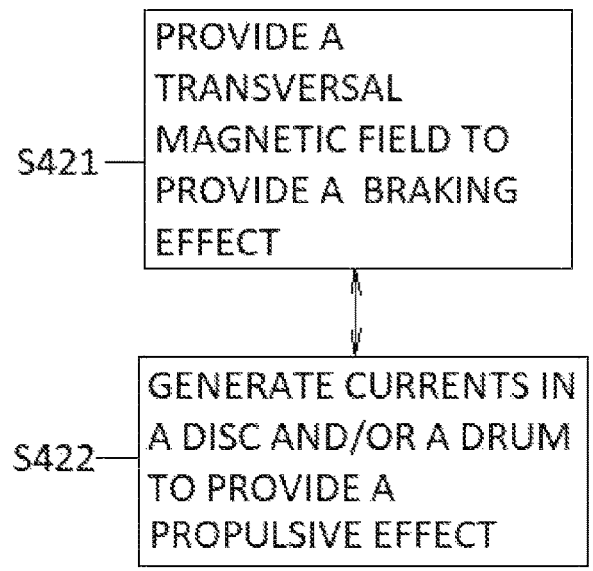
FIG. 17 is a block diagram of a method for operating an electromagnetic shock absorbing using an electromagnetic rotary shock absorber.

FIG. 17 is a block diagram of a method for operating an electromagnetic shock absorbing using an electromagnetic rotary shock absorber comprising: a shock absorbing unit with a rotor coupled with a conductive disc or drum and wherein one or more transversally oriented magnetic fields are provided by the shock absorbing unit to generate currents in the conductive disc or drum and to exert a Lorentz force opposite to the velocity of the conductive disc or drum, the electromagnetic rotary shock absorber characterized in that the rotor is in at least partial conductive contact with an electric control circuit, the method comprising the steps of:
  providing the one or more transversally oriented magnetic fields to provide a braking effect (S421);
  generating currents in the conductive disc or drum to provide a propulsive effect (S422), wherein the steps can be interchanged and/or combined and/or repeated.

In the proposed method the shock absorbing unit can be coupled to a controller (not shown).

Figure 18:
FIG. 18 is a schematic diagram of an electromagnetic rotary shock absorber comprising a shock absorbing unit and a shaped magnetic element providing a guiding element.

FIG. 18 is a schematic diagram of an electromagnetic rotary shock absorber comprising a shock absorbing unit (441) and a magnetic element (444) which can be variously shaped and can provide a guiding element. A translationally rotational movement can thus be provided by the proposed system. Various desired trajectories can be provided by the guiding element (444).

Figure 19:
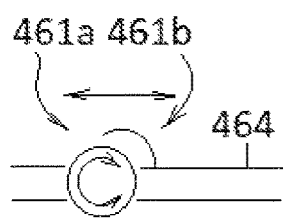
FIG. 19 is a schematic diagram of another electromagnetic rotary shock absorber comprising a shock absorbing unit and a magnetic element providing a guiding element.

FIG. 19 is a schematic diagram of an electromagnetic rotary shock absorber comprising a shock absorbing unit (461a, 461b) and a magnetic element (464) providing a guiding element.

Figure 20:
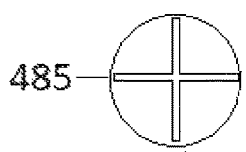
FIG. 20 is a schematic frontal view of a conductive disc which can be used in the embodiments shown in FIGS. 16, 18 and 19.

FIG. 20 is a schematic frontal view of a conductive disc (485) [which can be a composed of a plurality of sections from a magnetically conductive material] which can be used in the embodiments shown in FIGS. 16, 18 and 19.

Figure 21:
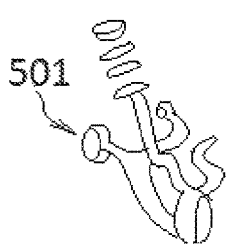
FIG. 21 is a perspective illustration of an electromagnetic rotary shock absorber comprising a shock absorbing unit coupled with a MacPherson suspension.

FIG. 21 is a perspective illustration of an electromagnetic rotary shock absorber comprising a shock absorbing unit (501) coupled with a MacPherson suspension.

Figure 22:
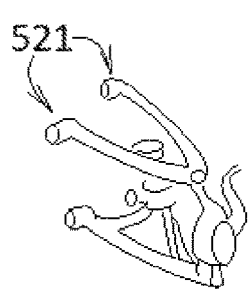
FIG. 22 is a perspective illustration of an electromagnetic rotary shock absorber comprising a shock absorbing unit coupled with a double wishbone suspension.

FIG. 22 is a perspective illustration of an electromagnetic rotary shock absorber comprising a shock absorbing unit (521) coupled with a double wishbone suspension (also called double A-arm, SLA).

Figure 23:
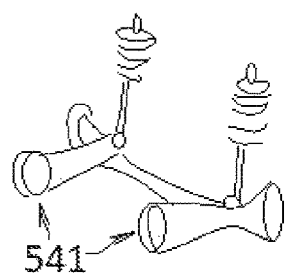
FIG. 23 is a perspective illustration of an electromagnetic rotary shock absorber comprising a shock absorbing unit coupled with a trailing arm suspension.

FIG. 23 is a perspective illustration of an electromagnetic rotary shock absorber comprising a shock absorbing unit (541) coupled with a (semi-) trailing arm suspension.

Figure 24:
FIG. 24 is a perspective illustration of an electromagnetic rotary shock absorber comprising a shock absorbing unit coupled with a multi-link suspension.

FIG. 24 is a perspective illustration of an electromagnetic rotary shock absorber comprising a shock absorbing unit (561) coupled with a multi-link suspension.

Figure 25:
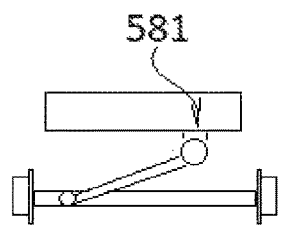
FIG. 25 is a rear view of an electromagnetic rotary shock absorber comprising a shock absorbing unit coupled with a Panhard bar suspension.

FIG. 25 is a schematic rear view of an electromagnetic rotary shock absorber comprising a shock absorbing unit (581) coupled with a Panhard bar suspension.

Figure 26:
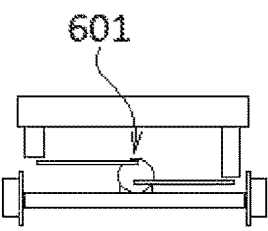
FIG. 26 is a rear view of an electromagnetic rotary shock absorber comprising a shock absorbing unit coupled with a Watt's link suspension.

FIG. 26 is a schematic rear view of an electromagnetic rotary shock absorber comprising a shock absorbing unit (601) coupled with a Watt's link suspension.

Figure 27:
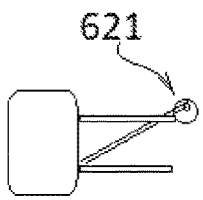
FIG. 27 is a rear view of an electromagnetic rotary shock absorber comprising a shock absorbing unit coupled with a push rod suspension.

FIG. 27 is a schematic rear view of an electromagnetic rotary shock absorber comprising a shock absorbing unit (621) coupled with a push rod suspension.

Figure 28:
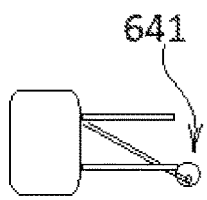
FIG. 28 is a rear view of an electromagnetic rotary shock absorber comprising a shock absorbing unit coupled with a pull rod suspension.

FIG. 28 is a schematic rear view of an electromagnetic rotary shock absorber comprising a shock absorbing unit (641) coupled with a pull rod suspension.

Figure 29:
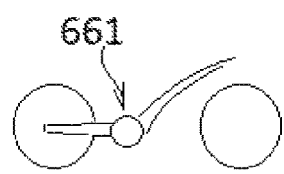
FIG. 29 is a side view of an electromagnetic rotary shock absorber comprising a shock absorbing unit coupled with a (bi-) or motorcycle active frame rear suspension.

FIG. 29 is a schematic side view of an electromagnetic rotary shock absorber comprising a shock absorbing unit (661) coupled with a (bi-) or motorcycle active frame rear suspension.

Figure 30:
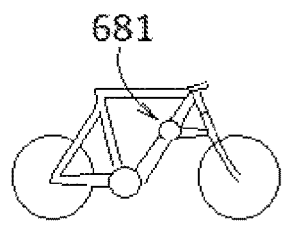
FIG. 30 is a side view of an electromagnetic rotary shock absorber comprising a shock absorbing unit coupled with a (bi-) or motorcycle active frame front suspension.

FIG. 30 is a schematic side view of an electromagnetic rotary shock absorber comprising a shock absorbing unit (681) coupled with a (bi-) or motorcycle active frame front suspension.

Figure 31:
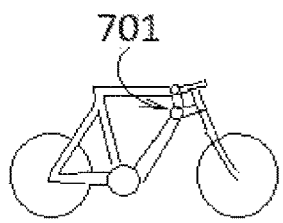
FIG. 31 is a side view of an electromagnetic rotary shock absorber comprising a shock absorbing unit coupled with another (bi-) or motorcycle active frame front suspension.

FIG. 31 is a schematic side view of an electromagnetic rotary shock absorber comprising a shock absorbing unit (701) coupled with another (bi-) or motorcycle active frame front suspension.

Figure 32:
FIG. 32 is a schematic side view of an electromagnetic rotary shock absorber comprising a shock absorbing unit coupled with a leaf spring suspension.

FIG. 32 is a schematic side view of an electromagnetic rotary shock absorber comprising a shock absorbing unit (721) coupled with a leaf spring suspension [a ground clearance can be changed, active or semi-adaptive suspension systems can be provided, etc.].

Figure 33:
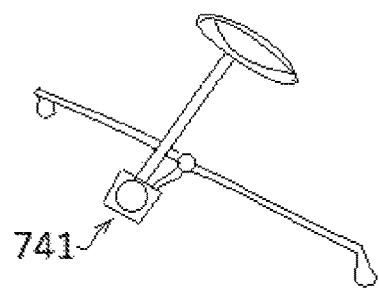
FIG. 33 is a perspective illustration of an electromagnetic rotary shock absorber comprising a shock absorbing unit coupled with a steering element.

FIG. 33 is a perspective illustration of an electromagnetic rotary shock absorber comprising a shock absorbing unit (741) coupled with a steering box [e.g. provided in a power steering system].

Figure 34:
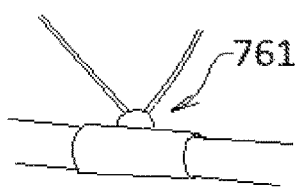
FIG. 34 is a perspective illustration of an electromagnetic rotary shock absorber comprising a shock absorbing unit coupled with a winch provided within a sailing ship's traveller system.

FIG. 34 is a perspective illustration of an electromagnetic rotary shock absorber comprising a shock absorbing unit (761) coupled with a winch [e.g. attached to a circular in cross-section bearing rail and provided at a mainsheet traveler, etc.] which can be manually, electrically, etc. controlled and which can act as a double-acting unit, that is in more winding/shock absorbing directions; such a hybrid unit (761) can be provided at different places of the traveler or can be provided by other winding constructions of a water vessel [e.g. at one or both traveler ends, at a helm, etc.] and the unit (761) can be coupled with various sheets, towing ropes, etc.

Figure 35:
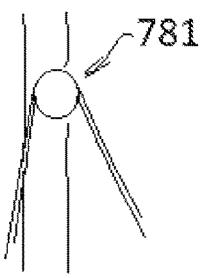
FIG. 35 is a perspective illustration of an electromagnetic rotary shock absorber comprising a shock absorbing unit coupled with a halyard winch.

FIG. 35 is a perspective illustration of an electromagnetic rotary shock absorber comprising a shock absorbing unit (781) coupled with a winch [e.g. provided at an upper mast as a halyard hybrid winch, etc.].

Figure 36:
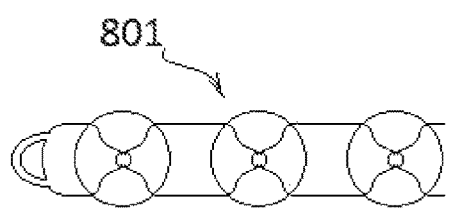
FIG. 36 is a schematic side view of an array of electromagnetic rotary shock absorbers coupled with an energy harvesting device (a wave/tidal energy to electric energy converter).

FIG. 36 is a schematic side view of an array of electromagnetic rotary shock absorbers comprising shock absorbing units (801) [which can be differently scaled] and provided in a chain-like structure which can be also used as an energy harvesting device [e.g. coupled with a wave/tidal energy to electric energy converter positioned on a water level and including buoyancy structures, static/dynamic mooring/anchoring structures, communication interfaces, power electronics and cables, etc., to harvest kinetic energy of waves].

Common Requirements

The invention proposes a hybrid magneto-conductive system. Wherein the (electro-) magnetic field is used to generate braking forces and a conductive coupling is used to generate driving forces and/or vice versa.

Control algorithms can be based upon prevailing apparatus conditions together with an active control [e.g. for each working mode can be set a different control program maximizing the braking (dampening, shock absorbing, etc.) effect and/or propulsive (driving, powering, etc.)

effect; such the control program can take into account the parameters in the whole array of active dampers, e.g. coupled to the same vehicle, etc.].

Control algorithms can be based upon retrieving external and/or internal system data; their evaluation; and deciding upon where the energy should be sent whether to the dampening unit or to the driving unit or both or to the rechargeable power source or via a wired or wireless charging unit to a wired or wireless static or dynamic charging unit [e.g. provided at a parking place, on a road, etc.]. The system can include a smart grid with smart components [e.g. smart substations] and the controller can evaluate the parameters obtained from the grid to choose the appropriate control settings within the vehicle converter and can decide where and how much electricity will be produced and distributed and where. The controller can further evaluate the status of a local (or distant) storage capacity, etc. Aggregators's systems can be used especially during peak and off-peak hours, local outages, for evaluating market prices, etc.

Controller can determine a number of activated electromagnetic components [e.g. coils] for electricity generation, braking and dampening functions, etc. [e.g. depending on inner and outer system sensors' signals].

Controllers may receive feedback from various operating condition sensors [e.g. rotational speed, bearings temperature, electrical potential and current, information from actuators about executed commands, informations via satellite connection, from external sensors, from the vehicle control unit, etc.].

Communication interfaces [e.g. electronic, human-machine, etc.] for local and/or distant wired and/or wireless communication can be further provided to communicate with the controllers and/or operators, central systems, cloud/fog/edge communication is contemplated as well. The controllers may report the operational state of the system, the outages, the state of charge of a local rechargeable power source, etc., locally and/or distantly via telephone techniques, satellite connections, wired connections, etc.

A control system can be provided to choose which shock absorbing unit will be activated to generate electricity and/or to provide a braking effect [e.g. in a form of a shock absorbing effect]. The electricity producing system can be coupled with a rechargeable power source system, with a static/dynamic charging station, with a smart grid, etc.

The control system can be provided in a central suspension control module controlling how the electrical power from a (rechargeable) power source is applied to each of actuators (inclusive of the proposed rotary shock absorbers) provided within a vehicle body. The rechargeable power source can be charged from a vehicle generator, a static/dynamic charging station, a vehicle's energy harvesting system provided by the proposed rotary shock absorber or other actuators [e.g. configured as electromechanical transducers]. Amplifiers can be used to drive the actuators of vehicle's assemblies. Based on inputs from individual sensors (accelerometers) or other sensors, the control system may control each actuator independently.

The control systems and methods can be provided analogically in (semi-) adaptive winches, adaptive wheel hubs, bicycle/motorcycle active frames, electric motors, wireless power transfer systems based on rotary mechanisms [e.g. in-wheel systems] or other applications which can combine driving and braking forces using the proposed mechanism.

All the mechano- and electrocomponents are well known in the art and connecting with them represents known constructions which does not need to be explicitly thought.

The shock absorbing unit(s) can be advantageously coupled to the particular components so that the shock absorbing unit(s) can remain in an active or passive regime to reduce vibrations, noises, or to actively set the position and/or the driving regime of the vehicle, etc.

Various mechanocomponents can be used as the system's components and in the proposed method to drive the shock absorbing unit with various types of couplings [e.g. male and female shaft coupling, homokinetic joints, belts, chains, shafts, etc.].

An electromagnetic clutch, flexible connections, etc., can be installed to compensate for misalignments, tilting, axial displacement, flexural deformations, twisting, bending, etc. Flexible materials such as rubber, natural rubber, elastomers, polymers, etc., may be used in the proposed system.

The components can have calculated optimum dimensions according to specific applications. The precision of the fabrication of individual components and of their installation can determine the bearing capacity, vibrations, the noise level, etc., of the system.

Supporting bearings, shafts, casings, housings, sensors, (self-) lubrication systems comprising oil coolers, oil pumps, etc., can be provided. Various lubrication systems can be used inclusive of solid lubricants/e.g. based on metal dichalcogenides/in combinations with a ceramic sleeve, conventional greases, liquid lubricants, etc.

The systems may be designed to switch between various (combined) drive/shock absorbing modes depending on vehicle velocity, a terrain profile (which can be communicated via satellite navigation, etc.), past experience, manual settings, or other conditions (analogically for other applications).

Various fabrication techniques can be used such as pultrusion, extrusion, (pre-) bending, moulding, drilling, milling, cutting, bonding, etc. Components can be optimised accordingly to a particular vehicle (or another application's) parameters.

Optimization programs can be provided adjusting parameters to produce an acceptable amount of electricity and/or dampening effect.

In active suspension systems, a controlled force is introduced between the mass of the vehicle and the mass of the wheel assemblies. Rotary and linear actuators [e.g. linear electromagnetic motors] can be combined in one system. A position command may be provided to the rotary actuators that is a function of a low pass filter of the suspension system of the vehicle. Electromagnetic actuators can be combined with other types such as pneumatic, hydraulic, electric, mechanical, passive elements [e.g. springs, dampers, combinations, etc.], steering linkages, etc. Front and rear wheels in a vehicle can have independent suspension assemblies.

The front suspensions may be of any type [e.g. McPherson strut type, double wishbone, multilink, etc.]. The suspensions may include various components such as arms, ball joints, bushings, tie rods, steering knuckles, torsion bar springs, the rear suspensions may be of any type [e.g. may include arm assemblies].

The vehicle may include sensors [e.g. position of sprung and unsprung components, accelerometers, vehicle position sensors, velocity sensors, steering angle sensors, other motion sensors, vehicle condition sensors, surrounding environment sensors, lasers, radars, thermometers sensing temperature of actuators, power electronics, etc.].

The suspension may include spring elements [e.g. leaf springs, coil springs, rubber springs, air springs, torsion bar springs, etc.] which can be arranged in parallel, in series, Conversion mechanisms may be used [e.g. a lead screw, a ball screw, a rack & pinion, a lever, etc.]. The electromagnetic actuators may receive electrical power from batteries, generators, alternators, capacitor banks, power converters, etc. Power sources may be located within the control systems or separately, or combinations.

The control systems can include various circuitries which may be located at anywhere in the vehicle inclusive of the shock absorbing active units. Generally, the control systems control how electrical power is distributed between the components of the system [e.g. can send signals to power amplifiers of electromagnetic rotary shock absorbers, etc.]. The controller can collect data from the sensors and determine the desired force between the sprung and unsprung masses, among a plurality of actuators and/or the rotary shock absorbers, etc. Any suitable control algorithm may be used to determine the force needed for each component of the system. Lower frequency forces and higher frequency forces, smaller forces over a wider bandwidth and large forces over a lower bandwidth, static and dynamic parameters [e.g. road conditions, preset drive modes], etc., can be combined. Crossover frequencies can be used to maintain operating temperatures of the components in optimal ranges and/or as a function of steering wheel input together with road and vehicle parameters. For example, when a steering input is detected and the road is relatively smooth, the crossover frequency may increase until the steering input is no longer present. The prolonged steering input is representative of operating in a sustained turn. Under such a condition, the system can distribute forces to the electromagnetic rotary shock absorbers to provide sustained force output to resist body roll and/or to adjust the vehicle into a desired position. Electromagnetic filters may be combined with other types [e.g. pneumatic, hydraulic, etc.]. Other parameters that may be used may include vehicle load, sustained cornering, sustained braking, operation on banked curves, overheating of any system component, etc. Fault conditions can be sensed [e.g. overheating, a stuck element, sensor failure, etc.]. In combined and/or reserve systems the controller can select another component to perform the entire operation in place of a defective component.

One electromagnetic rotary shock absorber can also work as a passive damper while another can be operated as an active damper. The electromagnetic rotary shock absorbers can operatively adjust the ground clearance of the vehicle [e.g. according to a vehicle regime, load, etc.]. The rotary shock absorbers can be used as a vehicle position source.

The rotary shock absorbers can be successfully used with any type of suspension, power steering, multiple wheels, or other automotive systems in active, semi-adaptive modes.

All kinematically-induced forces [i.e. the forces from the interaction between the tires and the road and inertia forces from the motion of the unsprung mass] are generally transferred via different suspension systems to a vehicle body. A steering yaw motion can be induced into a steering system. A wheel's static toe angle can be standardly determined by the geometry of a particular suspension [e.g. including toe control links]. Oversteer and understeer control systems can be generally provided as well as systems balancing lateral forces from tread width changes. Optimizing schemes for positioning the roll centers in relation with the center of gravity are used to minimize roll and anti-dive and anti-squat geometries and systems can be used to control the pitching motion [as an example of the most simple but effective system is in Citroen 2CV and derivatives using a leading arm in the front suspension and a trailing arm in the rear suspension]. Wheel camber (static or dynamic systems) can be also tuned by the proposed rotary suspension system. If used in the active suspension control, the system can also be designed and controlled to move a vehicle body in a substantially linear direction while the wheels being kept in a necessary contact with the ground.

Mechanical stops can be used in the suspension systems [e.g. fabricated from various materials such as thermoset polymeric elastomers, e.g. ethylene propylene diene monomer, natural rubber, neoprene, nitrile rubber, polyurethane, silicone rubber, styrene butadiene rubber, fluorocarbons, etc., or thermoplastic polymeric elastomers such as dynamically vulcanized elastomers, etc.].

Lateral tire stiffness and displacement, angulation of a wheel rim, cornering stiffness, keeping vehicle from lowering or rising, and other components can be considered as design parameters for the proposed system.

The electromagnetic rotary shock absorber can provide an assembly with an active control and a structural link coupled to a wheel assembly to define a relative rotation center and rotationally coupled to a sprung body. The suspension can form a geometry producing a maximum lateral displacement of the gravitational center within a defined limit.

The proposed shock absorber can be one of more defined relative rotation centers of a sprung body together with structural links defining a geometry producing a maximum longitudinal displacement within a defined limit.

Similarly a maximum horizontal and/or vertical displacement, the maximum toe change, the cornering stiffness, etc., can be controlled as well as the force applied between the body and wheel assembly.

The proposed rotary shock absorber can be coupled in upper and/or lower relative rotation centers (or upper and lower structural members) or at any places of suspension (steering) systems where an active control force can be applied between the body and wheel assembly.

The rotary shock absorbers can be coupled [e.g. by means of respective stator or rotor parts, by means of other components and mechanocomponents such as mechanisms translating a radial to a non-radial movement/e.g. a gear rack, etc./wherein the non-radial movement can be a linear or curvilinear or 3D movement] to the wheel assembly and/or to the sprung body at different places to enable a relative rotational and/or linear and/or curvilinear movement to provide pleasing ride characteristics in both passenger and utilitary vehicles.

Sensors may be attached to one of the proposed rotary electromagnetic shock absorbers, other actuator types, the frame, the wheel, etc., of a vehicle. The sensors can be integrated into the rotary electromagnetic shock absorber.

The rotary shock absorbers coupled with various types of winches can be used in a large number of applications not only limited on marine winches as shown in figures, but everywhere where a DC electric motor can be combined with an electromagnetic rotary shock absorber function (or energy harvesting function inclusive of regenerative braking function) in one assembly of the proposed hybrid electromagnetic shock absorber [e.g. as motors in various types of (aerial) vehicles, vessel, machines, building constructions, damping structures, etc.].

No limitations are intended others than as described in the claims. The present invention is not limited to the described exemplary embodiments. It should be noted that various modifications of the outer turbine can be made without departing from the scope of the invention as defined by the claims.

Elements, integers or components having known equivalents thereof are herein incorporated as if individually set forth.

The material components, materials, chemical substances and compounds, etc., described in this specification reflect the state of knowledge at the time of the filling of this application and may be developed in the future.

INDUSTRIAL APPLICABILITY

The present invention can be used for a large number of applications actively, semi-actively suspension systems, dampening oscillation of various frequencies and for a large number of vehicle types and other applications (e.g. hybrid winches, energy harvesting devices, etc.) combining driving and braking function in one hybrid wired/wireless apparatus.

I claim:

1. An electromagnetic rotary shock absorber, comprising: a shock absorbing unit with a rotor conductively coupled with a conductive disc or drum, and wherein one or more to a direction of rotation transversally oriented magnetic fields are provided by said shock absorbing unit to generate currents in said conductive disc or drum and to exert a Lorentz force opposite to the velocity of said conductive disc or drum, said electromagnetic rotary shock absorber characterized in that said rotor is in at least partial conductive contact with an electric control circuit.

2. The electromagnetic rotary shock absorber according to claim 1, wherein said shock absorbing unit is a double-acting unit.

3. The electromagnetic rotary shock absorber according to claim 1, wherein said shock absorbing unit contains a magnetic element, wherein at least one said magnetic element is selected from the group consisting of permanent magnets, electromagnets, magnetic conductors, hard magnetic materials, soft magnetic materials, electric conductors, semiconductors, materials providing low reluctance paths, or combinations thereof.

4. The electromagnetic rotary shock absorber according to claim 1, further providing translationally rotational movement.

5. The electromagnetic rotary shock absorber according to claim 1, couplable or coupled with a moving mean, wherein at least one said moving mean is selected from the group consisting of suspension arms, suspension bars, suspension struts, MacPherson suspensions, double wishbone suspensions, trailing arms suspensions, multi-link suspensions, Panhard bar suspensions, Watt's link suspensions, push rod suspensions, pull rod suspensions, custom built suspensions, leaf springs suspensions, coil springs suspensions, bicycle active frames, motorcycle active frames, active suspension systems, or combinations thereof.

6. The electromagnetic rotary shock absorber according to claim 1, couplable or coupled with a vehicle, wherein at least one said vehicle is selected from the group consisting of cycles, motorcycles, cars, vans, trucks, railway vehicles, air vehicles, amphibious vehicles, water vessels, or combinations thereof.

7. The electromagnetic rotary shock absorber according to claim 1, wherein at least one component is fabricated of a material, wherein at least one said material is selected from the group consisting of metals, metal alloys, superalloys, polymers, polymeric elastomers, carbon materials, polyester materials, epoxy materials, ceramics, glass, fiber materials, wood materials, wood compounds, nanomaterials, binders, heat resistant materials, water resistant materials, solvent resistant materials, chemically resistant materials, sandwiched materials, layered materials, radiation resistant materials, painted materials, galvanized materials, or combinations thereof.

8. The electromagnetic rotary shock absorber according to claim 1, couplable or coupled with a mechanocomponent, wherein at least one said mechanocomponent is selected from the group consisting of gear devices, transmission devices, shafts, rod, struts, links, arms, bushes, pivots, joints, bearings, slip rings, journals, pivots, torsion systems, guiding elements, steering elements, spring elements, mechanical stops, winches, braking systems, mechanisms translating radial to a non-radial movement, or combinations thereof.

9. The electromagnetic rotary shock absorber according to claim 1, couplable or coupled with an electrocomponent, wherein at least one said electrocomponent is selected from the group consisting of other electromagnetic rotary shock absorbers, sensors, targets, actuators, amplifiers, coils, variable resistance coils, resonators, rectifiers, filters, inverters, converters, transformers, voltage regulators, power factor corrections, compensations, power electronics, chargers, controllers, processors, inductors, capacitors, resistors, diodes, varactors, switches, conductors, rechargeable batteries, rechargeable power sources, source management systems, loads, power transfer interfaces, power cables, communication interfaces, communication cables, conductive bearings, slip rings, conductive journals, conductive pivots, commutators, input devices, output devices, electricity generators, electric motors, arrays of solar cells, hydrogen power units providing fuel cells, wind energy to electric energy converters, wave energy to electric energy converters, tidal energy to electric energy converters, flux alternators, energy harvesting devices, regenerative braking systems, smart electrocomponents, power distribution electrocomponents, wired charging stations, wireless charging stations, static charging stations, dynamic charging stations, offshore charging stations, on-board charging stations, clouds, fog nodes, edge nodes, or combinations thereof.

10. A method for operating an electromagnetic shock absorbing using an electromagnetic rotary shock absorber, comprising: a shock absorbing unit with a rotor conductively coupled with a conductive disc or drum, and wherein one or more to a direction of rotation transversally oriented magnetic fields are provided by said shock absorbing unit to generate currents in said conductive disc or drum and to exert a Lorentz force opposite to the velocity of said conductive disc or drum, said electromagnetic rotary shock absorber characterized in that said rotor is in at least partial conductive contact with an electric control circuit, the method comprising the steps of:
providing said one or more transversally oriented magnetic fields to provide a braking effect;
generating currents in said conductive disc or drum to provide a propulsive effect, wherein the steps can be interchanged and/or combined and/or repeated.

11. The method for providing alectromagnetic shock absorbing according to claim 10, wherein said shock absorbing unit is coupled to a controller.

12. The method for providing alectromagnetic shock absorbing according to claim 10, wherein at least one said shock absorbing unit is controlled by a control, wherein at least one said control be selected from the group consisting of electromagnetic, mechanical, pneumatic, hydraulic, manual, or combinations thereof.

* * * * *